(12) United States Patent
Hu et al.

(10) Patent No.: US 8,970,593 B2
(45) Date of Patent: Mar. 3, 2015

(54) VISUALIZATION AND REPRESENTATION OF DATA CLUSTERS AND RELATIONS

(75) Inventors: Yifan Hu, Mountain Lakes, NJ (US); Emden Gansner, Morristown, NJ (US); Stephen Kobourov, Tucson, AZ (US); Christopher T. Volinsky, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 735 days.

(21) Appl. No.: 12/633,233

(22) Filed: Dec. 8, 2009

(65) Prior Publication Data

US 2011/0134128 A1 Jun. 9, 2011

(51) Int. Cl.
*G06T 11/20* (2006.01)
*G06K 9/34* (2006.01)
*G06K 9/32* (2006.01)

(52) U.S. Cl.
CPC .................................. *G06T 11/206* (2013.01)
USPC ............................ 345/440; 382/175; 382/298

(58) Field of Classification Search
USPC .................................. 345/440; 382/175, 298
See application file for complete search history.

(56) References Cited

U.S. PATENT DOCUMENTS

| | | | |
|---|---|---|---|
| 2003/0224344 A1* | 12/2003 | Shamir et al. | 435/4 |
| 2007/0003166 A1* | 1/2007 | Berkner | 382/298 |
| 2007/0078846 A1* | 4/2007 | Gulli et al. | 707/5 |
| 2008/0075390 A1* | 3/2008 | Murai et al. | 382/284 |

OTHER PUBLICATIONS

Aurenhammer, "Voronoi Diagrams—A Survey of a Fundamental Geometric Data Structure", Sep. 1991, ACM Computing Surveys, vol. 23, No. 3, pp. 345-405.*
Hsien et al., "A simple GPU-based approach for 3D Voronoi diagram construction and visualization", Sep. 9, 2005, Simulation Modelling Practice and Theory, 13, pp. 681-692.*
Byelas, H et al., Visualization of Areas of Interest in Software Architecture Diagrams, Proceedings of the 2006 ACM Symposium on Software Visualization, pp. 105-114, 2006.
Collins, C et al., "Bubble Sets: Revealing Set Relations with Isocontours over Existing Visualizations", IEEE Transactions on Visualization and Computer Graphics, 15(6), pp. 1009-1016, 2009.
Simonetto, P. et al., "Fully Automatic Visualization of Overlapping Sets", Computer Graphics Forum, 28(3), pp. 967-974, 2009.

* cited by examiner

*Primary Examiner* — Xiao M. Wu
*Assistant Examiner* — Matthew D Salvucci
(74) *Attorney, Agent, or Firm* — Wolff & Samson, PC (57) ABSTRACT

Relational data can be visualized in a map representation. A plurality of vertices and edges are determined based on a set of data identifying objects (i.e., vertices) and relationships (i.e., edges). The vertices and edges are embedded in a planar graph and a Voronoi diagram is generated based at least the plurality of vertices within a set of bounding-points located at least a distance away from the vertices of the map. A bounding-box is associated with each of the vertices, and a set of points generated along each bounding-box. The Voronoi diagram is generated based on the vertices and the set of points of each bounding-box. Each resulting Voronoi cell associated with a common vertex is merged to form a plurality of common cells (i.e., map). The size of each bounding-box can correlate to the importance of its associated vertex, and the points along the bounding-box can be randomly perturbed.

16 Claims, 5 Drawing Sheets

VISUALIZATION AND REPRESENTATION OF DATA CLUSTERS AND RELATIONS

FIELD OF THE INVENTION

The present invention relates generally to data visualization, and more particularly to a map representation of data.

BACKGROUND

Presentation of data in a manner that is meaningful to a layperson or even an expert is a difficult task. Typical solutions include charts, Cartesian line graphs, histograms, and tables. However, these techniques generally do not provide an intuitive grasp of the underlying data. Cartograms can be used with data related to geographic areas (e.g., a countries) to redraw a map so that each geographic area is proportional to some metric. However, this technique is limited to known and pre-defined geographic areas. Cartograms can also be artistically rendered for data related to virtual communities. However, the creation of such cartograms has not been automated and requires significant individual/artistic license.

SUMMARY OF THE INVENTION

The present invention relates to visualization of relational data in a map representation. In accordance with an embodiment of the present invention, a plurality of data objects and relationships between respective pairs of data objects are determined within a set of data. The data objects are embedded in a plane based on the relationships between the objects. A Voronoi diagram is then generated based at least on the data objects within a set of bounding-points of the map.

In accordance with a further embodiment of the present invention, the data objects and relationships are part of a set of relational data. The data objects and relationships between data objects correspond to vertices and edges of a graph, such that embedding the plurality of data objects includes embedding the plurality of vertices and edges as a graph in a plane.

In yet a further feature of the present invention, the bounding-points are located at least a distance away from the data objects of the map. In yet a further feature of the present invention, a bounding-box can be associated with each of the data objects, and a set of points is then generated along each bounding-box. Each set of points is associated with the data object of the bounding-box along which they have been generated. The Voronoi diagram is generated based on the data objects and the set of points of each bounding-box. Each resulting Voronoi cell of the Voronoi diagram that is associated with a common vertex is then merged to form a plurality of common cells. The size of each bounding-box can correlate to the importance of its associated data object, and the points along the bounding-box can be randomly perturbed.

In yet a further feature of the present invention, a cluster analysis can be performed on the data objects to group data objects into clusters. After generating the Voronoi diagram, the cells of the data objects grouped into a cluster can then be merged. Additionally, the clusters can be colored such that no two neighboring clusters have a common color.

These and other advantages of the invention will be apparent to those of ordinary skill in the art by reference to the following detailed description and the accompanying drawings.

DETAILED DESCRIPTION

The present invention is directed to a method and system for visualization of data and automatic generation of a map representation of relational data describing objects and the relationships between the objects. Embodiments of the present invention are described herein to give a visual understanding of particular applications of the visualization techniques and resulting data representations. The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

The following discussion references the Figures. First, a discussion of an embodiment of a process for creating maps for visualizing relational data is presented without reference to an illustration of the resulting map. Following the discussion of the process, maps made in accordance with various embodiments of the present invention are discussed with reference to the process discussed earlier.

Figure 1:
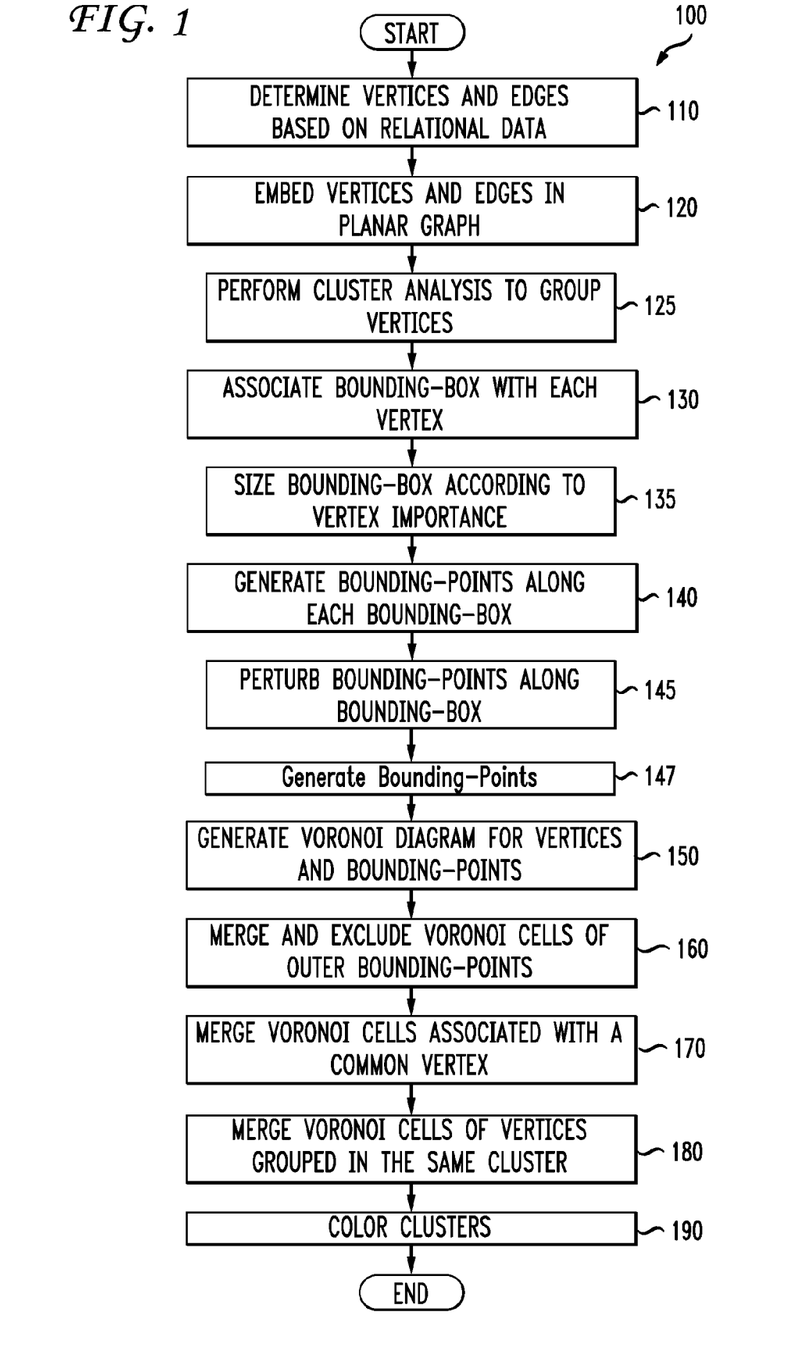
FIG. 1 is a flow chart of a process in accordance with an embodiment of the present invention.

FIG. 1 is a flow chart of a process 100 in accordance with an embodiment of the present invention for automating the creation of map representations of data. The process can be executed with respect to a set of relational data identifying at least a set of objects and relationships between the objects. For example, suitable data sets include television data identifying television shows and relationships between the shows. Relationships can be identified if two shows include a common actor, if the subject matter of two shows is similar, or if viewership demographics are similar. A similar data set can be obtained and analyzed for music, movies, and books. Other suitable data sets include trade relation data identifying a set of nations and trading relationships (e.g., whether two countries trade with one another or the volume of trade between two countries). The relational data can also include additional information such as the importance of each object or the weight of each relationship. The importance of an object or relationship can be derived from various criteria or combinations of criteria. For example, with respect to television shows, a show's importance can be determined by popularity, critical acclaim, the number of seasons/episodes, and other meta-data. Similarly, the importance of a relationship between two shows can be determined by the degree of similarity (e.g., the number of common actors, the similarity of plot or substance, or the degree of relative similarity of viewership).

In accordance with process 100, at step 110, the data set is analyzed to determine a set of vertices and edges between the vertices in order to create a graph of the data, for example by embedding the vertices and edges in a planar graph at step 120. Typically, the objects of the data are identified as vertices and the relationships between the objects are identified as the edges. In its full generality, the graph resulting from step 120 is a vertex-weighted and edge weighted. Vertex weight can be represented by the size of the map cell as discussed below. Edge weight can be represented by the distance between pairs of vertices or by the width of the representation of the edge between two vertices. The edges and vertices can be embedded in a plane to create a planar graph using various known techniques including principal component analysis, multi-dimensional scaling (MDS), force directed algorithm, and non-linear dimensionality reduction (e.g., LLE/Isomap).

A cluster analysis can be performed at step 125 to group the vertices into clusters. The clustering algorithm is preferably matched to the embedding algorithm to obtain the most visually appealing results. For example, a geometric clustering algorithm, such as k-means, is suitable for use with an MDS embedding algorithm, because the MDS algorithm places similar vertices in the same geometric region with good separation between clusters. Alternatively, a force directed embedding algorithm could be suitably paired with a modularity based clustering algorithm, because the two algorithms are strongly related.

In accordance with a further feature of the present invention, at step 130 a bounding-box can be associated with each vertex. At step 135, the bounding-box can be sized in accordance with the weight of the associated vertex. In one embodiment, the bounding-box can be used as location of a label for the map object. Alternatively, the bounding-box can be utilized simply to size the map cell. While the bounding-box illustrated in the Figures and describe below is rectangular a person of ordinary skill in the art would understand that other shapes and figures can be used.

At step 140, bounding-points are generated along each bounding-box. Because a bounding-box is associated with a vertex, each of the bounding-points along a bounding-box is associated with the vertex of the respective bounding-box. At step 145, the bounding-points can be randomly perturbed. The number and separation of the bounding-points, along with the degree of perturbance, will be factors in determining the aesthetic and shape of the resulting map cell. Thus, the number of bounding-points and the degree of perturbance can be adjusted to create the desired variation.

At step 147, additional outer bounding-points are generated. These additional bounding-points are used, in part, to define the boundaries of the map. Additionally, they can be used to define spaces between the vertices or clusters of vertices. That is, in the context of creating a geographic map based on the relational data, the additional outer bounding-points can be used to generate oceans, lakes, and other bodies of water. The outer bounding-points are preferably located at least a certain distance away from any vertex or bounding-box bounding-point. However, the precise distance can be randomized. Additionally, the number of outer bounding-points can be varied.

Once the graph of the vertices and edges has been embedded in a plane and the outer bounding-points have been defined, a Voronoi diagram of the vertices and bounding-points can be generated at step 150. If bounding-boxes and bounding-points along the bounding-boxes have been defined, the Voronoi diagram can be generated based on the vertices, outer bounding-points, and bounding-box bounding-points. The Voronoi diagram is comprised of a set of Voronoi cells. A Voronoi cell for a particular site (e.g., vertex, bounding-point, outer bounding-point) includes all points in space (e.g., in the plane in two-dimensional space) that are closer to the particular site than any other site.

Voronoi diagram generated at step 150 can be viewed as a map that includes bodies of water, continents, countries, cities, roads, and other features. As discussed below, further processing and modification of the Voronoi diagram can create or enhance these cartographic features. Representation of the relational data as a graph provides an intuitive and familiar context in which to understand the data.

At step 160, the Voronoi cells corresponding to the outer bounding-points are merged with neighboring Voronoi cells corresponding to outer bounding-points or excluded from the map. If the cells are merged, the resulting area can be viewed as water in a map. It should be noted that the minimum distance between any outer bounding-point and any non-outer bounding-point (e.g., the vertex and bounding-box bounding-points) can be adjusted to alter the degree of contiguousness of the land mass of the map. The effects of this minimum distance are illustrated and discussed with respect to FIG. 6.

At step 170, each of the Voronoi cells corresponding to a particular vertex (i.e., the Voronoi cell generated for the particular vertex, and all Voronoi cells generated for each point along the bounding-box associated with the particular vertex. Optionally, at step 180 the Voronoi cells corresponding to vertices grouped in a common cluster can be merged. In this manner, the clusters represent countries on a map and the vertices are cities or states within the country. Furthermore, each cluster can be shaded or colored to enhance the visual distinction between clusters. Similarly, individual Voronoi cells can also be colored regardless of whether they are merged into common clusters. Preferably, the map is colored in such that no two neighboring clusters have a common color.

While the foregoing process 100 is described with respect to relational data corresponding to vertices and edges, a person of ordinary skill in the art would understand that the data being represented as a map is not limited to a graph, but can include any set of related data objects that are embedded in a plane such that a relationships between two data objects is reflected in the location of the two related data objects relative to each other. For example, related data objects are preferably located more closely to each other than to data objects to which there is no relationship.

The degree of relationship between two data objects (e.g., how strongly or weakly related) can also be reflected in the embedding of data objects by correlating the degree of the relationship between two data objects to the distance between the two data objects. In its full generality each data object is related to every other data object. However, various thresholds can be established to limit the degree of the relationship. For example, if the degree of relationship between two data objects is less than a particular threshold, the data objects can be treated as unrelated. If the degree of relationship is greater than a particular threshold, the data objects can be treated as having a maximum degree of relationship. In this manner, the degree of relationship can be compressed to within a desired range.

The process 100 discussed above automates the creation of a map for visualizing relational data. FIGS. 2-6, discussed below are maps created in accordance with various features of the process 100.

Figure 2:
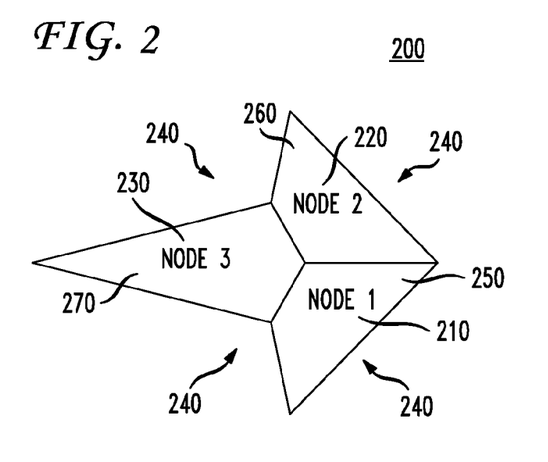
FIG. 2 is a map representation of data in accordance with an embodiment of the present invention.

FIG. 2 is a map 200 representation of data in accordance with an embodiment of the present invention. Specifically, FIG. 2 illustrates a mapping of a dataset having three objects: node-1 210; node-2 220; and node-3 230. These objects were embedded in a plane along with bounding-points 240. A Voronoi diagram was generated for the bounding-points and objects 220, 230, and 240. The resulting graph contains cell 250 corresponding to node-1 210, cell 260 corresponding to node-2 220, and cell 270 corresponding to node-3 230.

Figure 3:
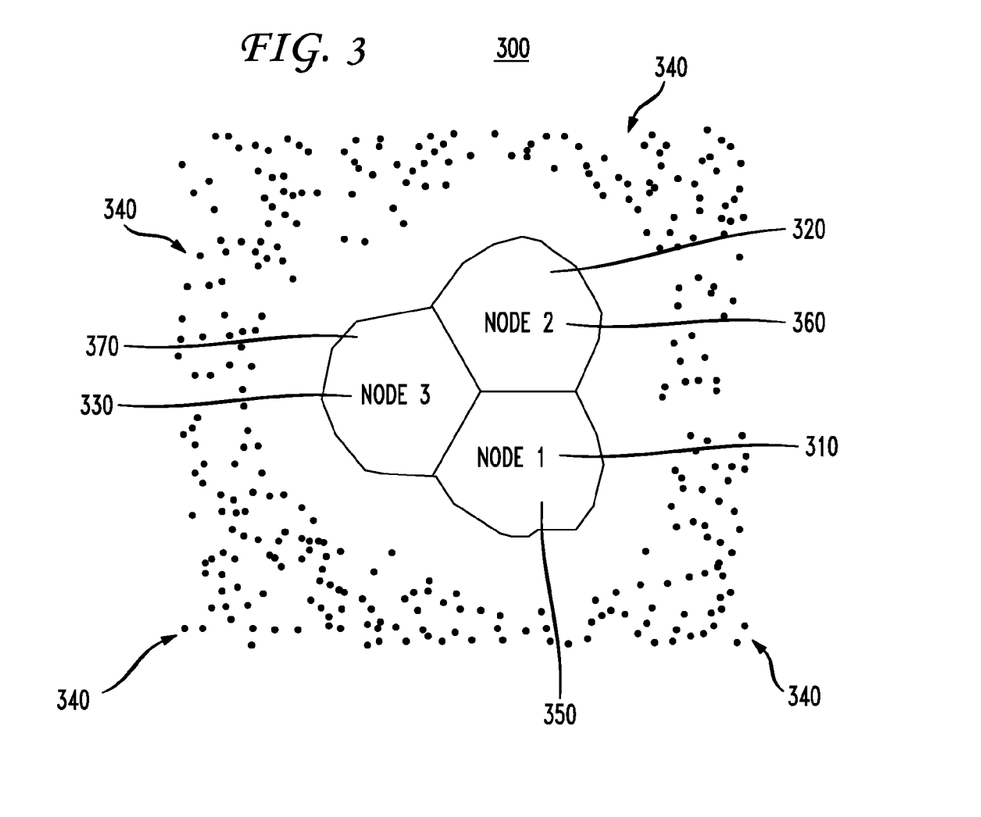
FIG. 3 is a map representation of data in accordance with an embodiment of the present invention.

While map 200 illustrates a map in accordance with an embodiment of the present invention, it contains several sharp angles that can distract from the aesthetic of the map. FIG. 3 illustrates a map 300 similar to that of map 200, however, the Voronoi diagram of map 300 has been generated using many more boundary points 340 randomly placed at least a predetermined distance from node-1 310, node-2 320, and node-3 330. As illustrated cells 350, 360, and 370 have more complex shapes.

Figure 4:
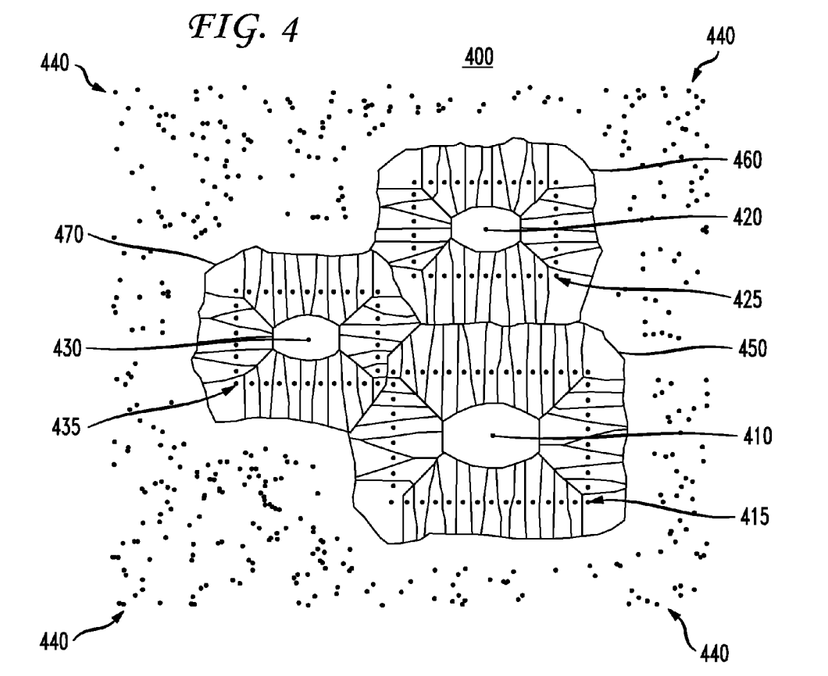
FIG. 4 is a map representation of data in accordance with an embodiment of the present invention.

In FIG. 4, a bounding-box generated for each object as discussed with respect to step 130 is illustrated. Specifically, bounding-points 415 substantially outline a bounding-box associated with node-1 410, bounding-points 425 substantially outline a bounding-box associated with node-2 420, and bounding-points 435 substantially outline a bounding-box associated with node-3 430. The bounding-points along each bounding-box have also been perturbed as described with respect to step 145. Additionally, outer bounding-points 440 have been placed at least a certain distance from the vertices and the bounding-box bounding-points.

The Voronoi diagram was generated for node-1 410, bounding-points 415, node-2 420, bounding-points 425, node-3 430, bounding-points 435, and outer bounding-points 440. The Voronoi cells generated for the outer bounding-points have been discarded, and each Voronoi cell associated with a common vertex has been shaded similarly. That is, for example, the Voronoi cell of node 415 and the Voronoi cell of each bounding-point 415 of the bounding-box associated with node 415 has been shaded the same color.

A close examination of bounding-points 415, 425, and 435 reveals that the bounding-boxes associated with nodes 410, 420, and 430 differ in size. This size difference is illustrative of the relative importance of nodes, 410, 420 and 430. The result of this difference in bounding-box size is that cell 450 is larger than cell 460, which is larger than cell 470.

Figure 5:
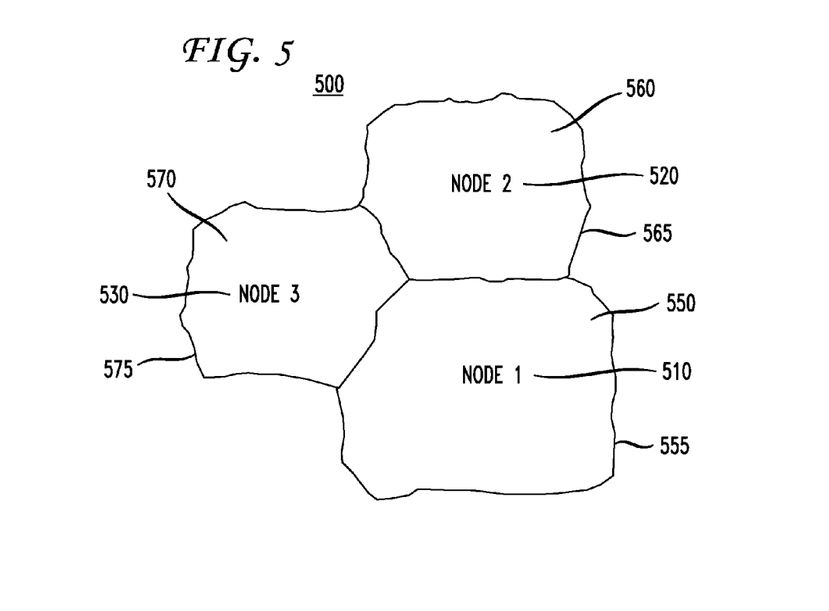
FIG. 5 is a map representation of data in accordance with an embodiment of the present invention.

In FIG. 5, each Voronoi cell associated with a common vertex has been merged to generate a set of common cells. For example, all Voronoi cells associated with node 510 have been merged to form common cell 550. Common cell 550 includes perimeter 555 that is irregular and aesthetically similar to an outline of a country or geographic region in a map. Similarly, all Voronoi cells associated with node 520 have been merged to form common cell 560 having perimeter 565, and all Voronoi cells associated with node 530 have been merged to form common cell 570 having perimeter 575.

Figure 6:
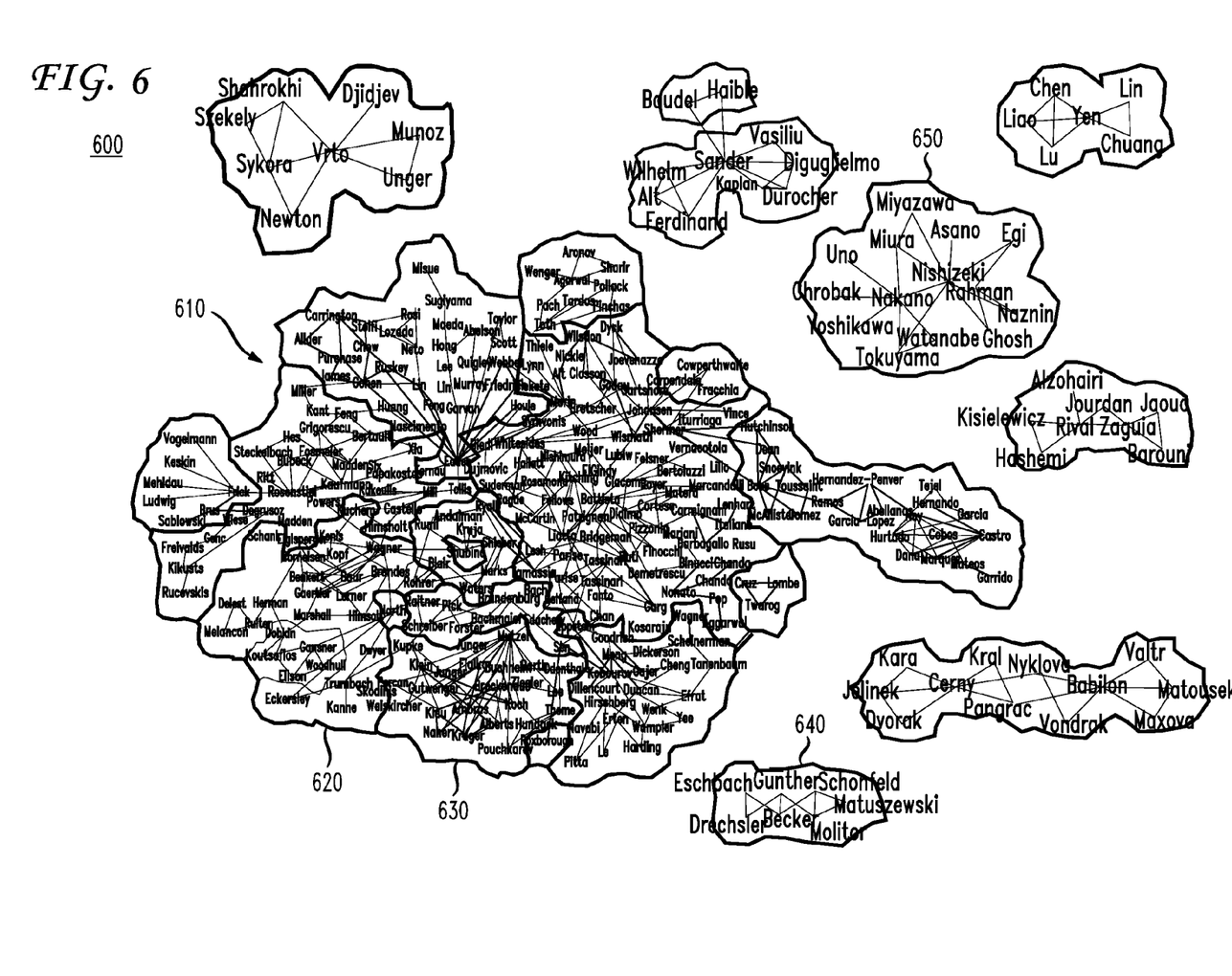
FIG. 6 is a map representation of data in accordance with an embodiment of the present invention.

FIG. 6 is a map 600 generated in accordance with an embodiment of the present invention of the collaborative authorship of papers presented at the Symposium on Graph Drawing from 1994 to 2004. The graph includes 509 vertices (i.e., authors) and 1517 edges (i.e., collaborative relationships). The graph is cumulative in the sense that two authors are connected with an edge it they have written at least one joint paper. In accordance with one feature of the present invention, the number of collaborations between two authors can be presented in the graph by the width of the edge connecting the two authors. The authors have been clustered into groups based on the frequency and interconnectedness of collaboration. Each Voronoi cell of a cluster has been shaded in the same manner to form a country.

As illustrated, a continent 610 is generated having approximately 20 countries (i.e., clusters), such as country 620 and country 630, determined by the collaborative patterns. Certain groups of authors have never collaborated. This is clearly illustrated by the "islands" (e.g., island 640 and island 650). The likelihood and/or frequency of the generation of islands can be influenced by the choice of the parameter determining the minimum distance between an outer bounding-point and any vertex or bounding-box bounding-point.

Figure 7:
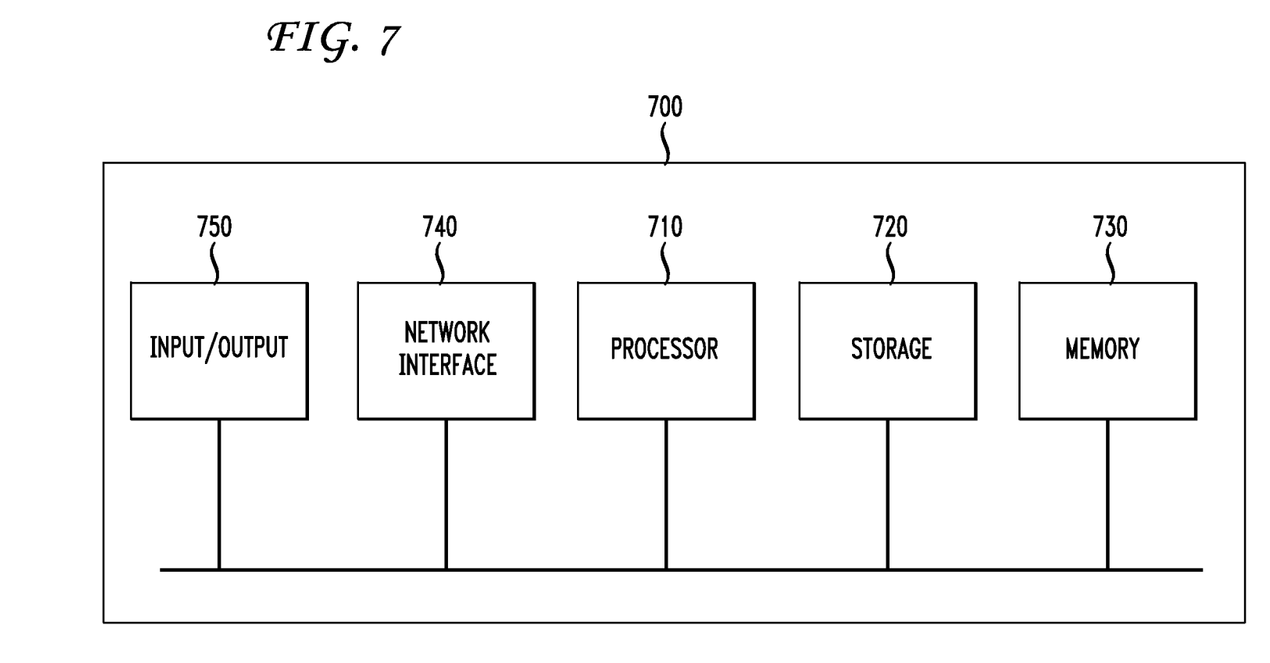
FIG. 7 is a high-level block diagram of a computer in accordance with an embodiment of the present invention.

The above-described methods for visualizing data can be implemented on a computer using well-known computer processors, memory units, storage devices, computer software, and other components. A high-level block diagram of such a computer is illustrated in FIG. 7. Computer 700 contains a processor 710 that controls the overall operation of the computer 700 by executing computer program instructions, which define such operations. The computer program instructions may be stored in a storage device 720, or other computer readable medium (e.g., magnetic disk, CD ROM, etc.), and loaded into memory 730 when execution of the computer program instructions is desired. Thus, the method steps of FIG. 1 can be defined by the computer program instructions stored in the memory 730 and/or storage 720 and controlled by the processor 710 executing the computer program instructions.

For example, the computer program instructions can be implemented as computer executable code programmed by one skilled in the art to perform an algorithm defined by the method steps of FIG. 1. Accordingly, by executing the computer program instructions, the processor 710 executes an algorithm defined by the method steps of FIG. 1. The computer 700 also includes one or more network interfaces 740 for communicating with other devices via a network. The computer 700 also includes input/output devices 750 that enable user interaction with the computer 700 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

We claim:

1. A method for visualizing data in a map, the method comprising:
   identifying a plurality of data objects and a plurality of relationships between respective pairs of data objects;
   calculating a degree of a relationship between data objects within the respective pairs of data objects, wherein:
      the data objects within the respective pairs of data objects are identified as unrelated to each other when the degree of the relationship between the data objects within the respective pairs data object is below a pre-determined threshold; and
      the data objects within the respective pairs of data objects are identified as maximally related to each other when the degree of the relationship between the data objects within the respective pairs of data object exceeds a pre-determined threshold;

embedding the plurality of data objects in a planar graph based on the plurality of relationships between the data objects within the respective pairs of data objects, wherein the data objects within a first respective pair of data objects are embedded in the planar graph closer to each other than the data objects within a second respective pair of data objects, wherein the degree of a relationship between the data objects within the first respective pair of data objects is higher that the degree of a relationship between the data objects within the second respective pair of data objects;

associating a bounding-box with each of the plurality of data objects, wherein the size of each bounding-box correlates to an importance of the data object;

generating outer bounding-points to define boundaries of the map;

randomly perturbing the outer bounding-points, wherein a number of the outer bounding-points, separation of the outer bounding-points, and a degree of perturbance determine an aesthetic and shape of the map;

adjusting the number of bounding-points and the degree of perturbance to create a desired shape; and generating a Voronoi diagram for the plurality of data objects within a set of bounding-points based on the outer bounding-points and the plurality of data objects embedded in the planar graph.

2. The method of claim 1, wherein the plurality of data objects comprise relational data, each data object corresponds to a vertex and each relationship corresponding to an edge between respective vertices, and embedding the plurality of data objects comprises embedding the plurality of vertices and the plurality of edges in the planar graph.

3. The method of claim 2, wherein one of the plurality of edges is weighted, the edge weight corresponding to a positional relationship for an associated pair of objects in the planar graph.

4. The method of claim 1, wherein the set of bounding-points are located a first distance away from each of the plurality of data objects.

5. The method of claim 1, further comprising:
generating a plurality of points along each bounding-box, each of the plurality of points being associated with the respective data object of each bounding-box, and the Voronoi diagram being generated for the plurality of data objects and the plurality of points along each bounding-box; and merging each Voronoi cell of the Voronoi diagram associated with a common data object to form a plurality of common cells.

6. The method of claim 1, further comprising performing a cluster analysis to group data objects into one cluster.

7. The method of claim 6, further comprising merging the Voronoi cells of the data objects grouped into a respective cluster.

8. The method of claim 6, further comprising coloring each cluster such that no two neighboring clusters have a common color.

9. A system for visualizing data in a map, the apparatus comprising:
a processor; and
a memory to store computer program instructions, the computer program instructions when executed on the processor cause the processor to perform operations comprising:
identifying a plurality of data objects and a plurality of relationships between respective pairs of data objects;

calculating a degree of a relationship between data objects within the respective pairs of data objects, wherein:
the data objects within the respective pairs of data objects are identified as unrelated to each other when the degree of the relationship between the data objects within the respective pairs data object is below a pre-determined threshold; and
the data objects within the respective pairs of data objects are identified as maximally related to each other when the degree of the relationship between the data objects within the respective pairs of data object exceeds a pre-determined threshold;

embedding the plurality of data objects in a planar graph based on the plurality of relationships between the data objects within the respective pairs of data objects, wherein the data objects within a first respective pair of data objects are embedded in the planar graph closer to each other than the data objects within a second respective pair of data objects, wherein the degree of a relationship between the data objects within the first respective pair of data objects is higher that the degree of a relationship between the data objects within the second respective pair of data objects;

associating a bounding-box with each of the plurality of data objects, wherein the size of each bounding-box correlates to an importance of the data object;

generating outer bounding-points to define boundaries of the map;

randomly perturbing the outer bounding-points, wherein a number of the outer bounding-points, separation of the outer bounding-points, and a degree of perturbance determine an aesthetic and shape of the map;

adjusting the number of bounding-points and the degree of perturbance to create a desired shape; and generating a Voronoi diagram for the plurality of data objects within a set of bounding-points based on the outer bounding-points and the plurality of data objects embedded in the planar graph.

10. The system of claim 9, wherein relational data comprises the plurality of data objects and the plurality of relationships, each data object corresponding to a vertex and each relationship corresponding to an edge between respective vertices, and embedding the plurality of data objects comprises embedding the plurality of vertices and the plurality of edges in the planar graph.

11. The system of claim 10, operations further comprising weighting one of the plurality of edges, wherein embedding represents the edge weight as positional relationship for an associated pair of objects in the planar graph.

12. The system of claim 9, wherein the set of bounding-points are located a first distance away from each of the plurality of data objects.

13. The system of claim 9, operations further comprising:
generating a plurality of points along each bounding-box, each of the plurality of points being associated with the respective data object of each bounding-box, and the Voronoi diagram being generated for the plurality of data objects and the plurality of points along each bounding-box; and merging each Voronoi cell of the Voronoi diagram associated with a common data object to form a plurality of common cells.

14. The system of claim 9, operations further comprising performing a cluster analysis to group data objects into one cluster.

15. The system of claim 14, operations further comprising merging the Voronoi cells of the data objects grouped into a respective cluster.

16. The system of claim 14, operations further comprising coloring each cluster such that no two neighboring clusters have a common color.

* * * * *